United States Patent [19]

Sawada et al.

[11] Patent Number: 4,923,632
[45] Date of Patent: May 8, 1990

[54] LIQUID CRYSTAL COMPOSITION FOR TWIST NEMATIC MODE

[75] Inventors: Shinichi Sawada; Toyoshiro Isoyama, both of Ichiharashi; Tetsuya Matsushita, Sodegauramachi; Hideo Saito, Ichiharashi, all of Japan

[73] Assignee: Chisso Corporation, Japan

[21] Appl. No.: 272,942

[22] Filed: Nov. 18, 1988

[30] Foreign Application Priority Data

Nov. 24, 1987 [JP] Japan ................................ 62-293906

[51] Int. Cl.⁵ ........................ G02F 1/13; G09K 19/34; G09K 19/30
[52] U.S. Cl. ............................. 252/299.61; 252/299.5; 252/299.63; 350/350 R
[58] Field of Search ........... 252/299.5, 299.61, 299.63; 350/350 R

[56] References Cited

U.S. PATENT DOCUMENTS

| | | | |
|---|---|---|---|
| 4,130,502 | 12/1978 | Eidenschink et al. | 252/299 |
| 4,405,488 | 9/1983 | Sugimori et al. | 252/299.63 |
| 4,422,951 | 12/1983 | Sugimori et al. | 252/299.63 |
| 4,439,340 | 3/1984 | Kojima et al. | 252/299.63 |
| 4,536,321 | 8/1985 | Sugimori et al. | 252/299.63 |
| 4,581,155 | 4/1986 | Goto et al. | 252/299.61 |
| 4,640,795 | 2/1987 | Ogawa et al. | 252/299.61 |
| 4,695,398 | 9/1987 | Goto et al. | 252/299.5 |
| 4,776,975 | 10/1988 | Sawaba et al. | 252/299.61 |
| 4,853,152 | 8/1989 | Goto | 252/299.63 |

FOREIGN PATENT DOCUMENTS

| | | | |
|---|---|---|---|
| 3500897 | 7/1986 | Fed. Rep. of Germany | 252/299.61 |
| 105701 | 7/1973 | German Democratic Rep. | 252/299.63 |
| 56-135445 | 10/1981 | Japan | 252/299.63 |
| 62-127384 | 6/1987 | Japan | 252/299.61 |
| 63-196685 | 8/1988 | Japan | 252/299.61 |

*Primary Examiner*—Teddy S. Gron
*Attorney, Agent, or Firm*—Leydig, Voit & Mayer

[57] ABSTRACT

A liquid crystal composition for twist nematic mode having improved reduction in threshold voltage and temperature dependency of the threshold voltage in a liquid crystal display element using the composition, and a liquid crystal display element are provided, which composition comprises a compound of the formula

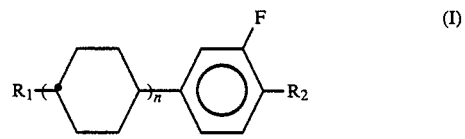
(I)

wherein $R_1$ is 1-8C alkyl, $R_2$ is F or CN and n is 1 or 2; or comprises the compound of the formula (I) as a first component and at least one member as a second component selected from compounds of the following formulas (II), (III) and (IV);

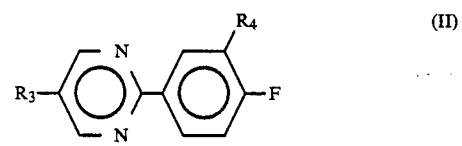

(II)

wherein $R_3$ is 1-8C alkyl and $R_4$ is H or F,

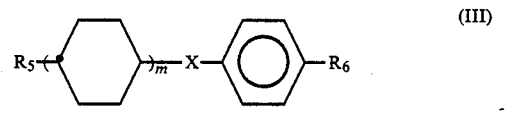
(III)

wherein $R_5$ is 1-8C alkyl, $R_6$ is 1-8C alkoxy or F, m is 1 or 2 and X is single bond or —COO—, and

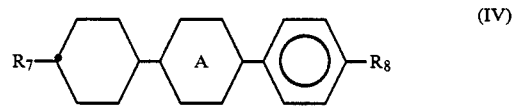
(IV)

wherein $R_7$ is 1-8C alkyl, $R_8$ is 1-8C alkyl or alkoxy, F or CN and

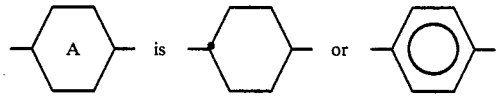

24 Claims, No Drawings

LIQUID CRYSTAL COMPOSITION FOR TWIST NEMATIC MODE

BACKGROUND OF THE INVENTION

1. Field of the Invention

This invention relates to a liquid crystal composition for twist nematic (hereinafter abbreviated to TN) mode and a liquid crystal display element of TN mode using the above-mentioned composition. More particularly it relates to a liquid crystal composition capable of reducing the threshold voltage (hereinafter abbreviated to Vth) of TN mode liquid crystal display elements and improving the temperature dependency thereof.

2. Description of the Related Art

In recent years, the performance of liquid crystal display devices have been improved and their fields of application have been being broadened. When introduced liquid crystal display devices were mainly used for handy type electronic calculators, watches, clocks, etc., making use of the specific feature of the small power consumption thereof. Recently, however, the fields of application of the devices, in combination with development of liquid crystal compositions, have come to be rapidly broadened toward those of large-size devices such as outdoor display devices, instrument panels for automobiles, and further, display devices for hand-held computers, terminals of computers, etc.

From the viewpoint of the driving mode of display devices relative to the foregoing, since the quantity of information has increased and the number of parts has been reduced, the 3 V drive static mode at the initial period has come to be transferred to 3 V drive, ½ duty in the case of watches, etc., 3 V drive, ⅓ to 1/4 duty in the case of electronic calculators, and 4.5 V drive, 1/16 duty and ten and several V drive, 1/64 duty or further, highly functional display having higher driving voltage and multiplex number in the case of graphic displays such as those of word processors, computer terminals, etc. Further, in addition to these movements, need for low voltage drive as one more specific feature of liquid crystal display devices, has come to be intensified in order to realize making LCD smaller and more lightweight. For example, ½ to ¼ duty in the case of watches, electronic calculators, etc. has been desired to be driven at 1.5 V, 1/16 duty in the case of word processors, etc., at 3 V, and 1/64 duty in the case of computer terminals, etc., at 10 V or lower. Namely, it has been desired to reduce the threshold voltage in the voltage-brightness characteristic of liquid crystal compositions, but it has been very difficult in the case of conventional materials to effect low voltage drive, while satisfying specific features for securing a display quality as mentioned later, i.e. a sufficiently low optical anisotropy value for securing a broad viewing angle and a small temperature-dependency value of threshold voltage.

Usually, in the case of a multiplex drive mode employing a voltage-leveling method, there is an operational restriction which does not occur at all in principle in the case of a static mode. Namely, cross-talk is liable to occur in a half-selected element or unselected element. Furthermore, the higher the multiplex, the less the allowance of the operating voltage, in short, the operating margin; hence cross-talk is more liable to occur.

The operating margin depends on the following three factors: ① temperature dependency of threshold voltage, ② viewing angle dependency of threshold voltage and ③ steepness of threshold voltage.

As to the factor ② among these three, a product of the thickness of display cell (hereinafter abbreviated to d) by the optical anisotropy value (hereinafter abbreviated to $\Delta n$) i.e. a light path length of birefringence (hereinafter abbreviated to d·$\Delta n$) has a great influence upon the factor ②. For example, it has generally been carried out to obtain a display element of broad viewing angle, by satisfying the following conditional equation (1) derived from Gooch-Tarry's equation (J. Phys. D.: Appl. Phys., vol. 8, 1975)

$$T = \frac{\sin^2[\theta(1 + u^2)^{\frac{1}{2}}]}{(1 + u^2)}$$

wherein T: light transmittance, $\theta$: twist angle, u: $\pi d \cdot \Delta n / \theta \lambda$, and $\lambda$: wavelength:

$$d \cdot \Delta n = 550 nm \qquad \ldots (1)$$

In general, it is difficult in the aspects of cell preparation and product yield to make the cell thickness (d) 5 μm or less; hence the $\Delta n$ value of liquid crystal materials is preferred to be less than 0.11 in view of the above equation (1). The above factor ③ is specific of TN mode liquid crystal display devices, and no notable difference in the factor ③ occurs depending on materials. The above factor ① has a relation also with the operating temperature range, and is most affected by materials. In general, as a countermeasure to liquid crystal compositions in order to improve the above factor ①, the proportion of a material having a negative dielectric anisotropy value (hereinafter abbreviated to $\Delta \epsilon$) has been increased to thereby reduce the temperature dependency of threshold voltage. However, an increase in the proportion of a material having a negative $\Delta \epsilon$ raises the threshold voltage; hence a sufficiently low voltage drive could not have been achieved.

Further, in the case of display devices, the response rate is a nonnegligible and important factor. It is well known that the response rate of liquid crystal display devices has a correlationship with the viscosity of liquid crystal compositions relative thereto.

SUMMARY OF THE INVENTION

As apparent from the foregoing, an object of the present invention is to provide a nematic liquid crystal composition which has a sufficiently low optical anisotropy α value and also a sufficiently low threshold voltage value for effecting a broad viewing angle, while keeping various characteristics required for liquid crystal display devices such as operating temperature range, response rate, etc. well-balanced, and providing an improved temperature dependency.

Another object of the present invention is to provide a liquid crystal display element which can be driven at low voltages, has a broad viewing angle and has a small temperature dependency.

The present invention in a first aspect resides in a liquid crystal composition for a twist nematic mode comprising a compound expressed by the formula

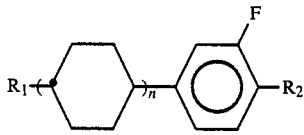

wherein $R_1$ represents an alkyl group of 1 to 8 carbon atoms, $R_2$ represents F or CN and n represents 1 or 2;

as a preferred embodiment of the above composition, a liquid crystal composition comprising a first component including at least one member of the compound expressed by the above formula (I) and a second component including at least one member selected from the group consisting of a compound expressed by the formula

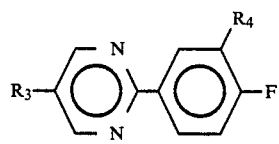

wherein $R_3$ represents an alkyl group of 1 to 8 carbon atoms and $R_4$ represents H or F, a compound expressed by the formula

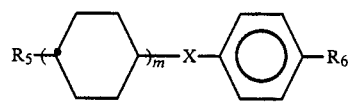

wherein $R_5$ represents an alkyl group of 1 to 8 carbon atoms, $R_6$ represents an alkoxy group of 1 to 8 carbon atoms of F, m represents 1 or 2 and X represents a single bond or —COO—, and a compound expressed by the formula

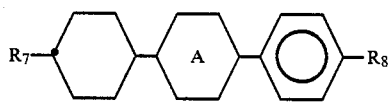

wherein $R_7$ represents an alkyl group of 1 to 8 carbon atoms, $R_8$ represents an alkyl group or alkoxy group each of 1 to 8 carbon atoms, F or CN group and

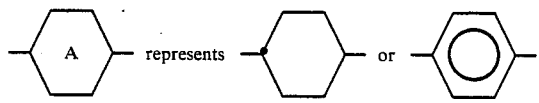

The present invention in the second aspect resides in a liquid crystal display element using a liquid crystal composition for twist nematic mode comprising a compound expressed by the formula

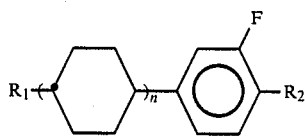

wherein $R_1$ represents an alkyl group of 1 to 8 carbon atoms, $R_2$ represents F or CN and n represents 1 or 2;

and as an embodiment of the above element, a liquid crystal display element using a liquid crystal composition for twist nematic mode comprising a first component comprising at least one member of the above compound expressed by the formula (I) and a second component comprising at least one member selected from the group consisting of the above compounds expressed by the formulas (II), (III) and (IV).

DETAILED DESCRIPTION OF PREFERRED EMBODIMENTS

In the liquid crystal composition of the present invention, the content of the compound of the formula (I) when n=1, i.e. a two-ring compound, is preferably about 13 to 40% by weight and the content of the compound of the formula (I) when n=2, i.e. a three-ring compound, is preferably about 14.2 to 60% by weight. The content of the compound expressed by the formula (II) is preferably 25% by weight or less, that of the compound expressed by the formula (III) is preferably 30% by weight or less and that of the compound expressed by the formula (IV) is preferably 35% by weight or less.

Besides the above compounds of the formulas (I) to (IV), the liquid crystal composition of the present invention may further contain other nematic liquid crystals or liquid crystalline compounds for adjusting threshold voltage, mesomorphic range, viscosity, etc. in a suitable quantity, within a range where the object of the present invention is not damaged.

Preferred representative examples of such other compounds are as follows:

4-(trans-4-alkylcyclohexyl)benzonitriles,
4'-alkyl-4-cyanobiphenyls,
trans-2-(4-cyanophenyl)-5-alkyl-1,3-dioxanes,
4-(trans-4-alkoxymethylcyclohexyl)benzonitriles, etc.

In the liquid crystal composition of the present invention, compounds of the formula (I) when n=1, i.e.

4-(trans-4-alkylcyclohexyl)-1,2-difluorobenzenes and
4-(trans-4-alkylcyclohexyl)-2-fluorobenzonitriles
mostly exhibit no liquid crystal phase at room temperature, but these compounds have an effectiveness of increasing the $\Delta\epsilon$ value obtained of compositions using them, toward positive values and reducing the $\Delta n$ value thereof. The content of these compounds are preferably about 13 to 40% by weight. If it is less than about 13% by weight, contribution of $\Delta\epsilon$ is small and reduction in the threshold voltage value is insufficient, whereas if it exceeds about 40% by weight, they mostly exhibit no liquid crystal phase at room temperature, as described above; thus the clearing point of the resulting composition is often lower and hence such high concentrations are undesirable.

Further, compounds of the formula (I) wherein n=2, i.e.

4{trans-4-(trans-4-alkylcyclohexyl)cyclohexyl}-1,2-difluorobenzenes, exhibit a high nematic-isotropic liquid phase transition point (hereinafter referred to as clearing point) of 85.4° C. or higher, a small $\Delta n$ value, a low viscosity and a positive $\Delta\epsilon$ value.

Further, 4-{trans-4-(trans-4-alkylcyclohexyl)cyclohexyl}-2-fluorobenzonitriles exhibit a clearing point of 176.5° C. or higher and a positive large $\Delta\epsilon$ value. These compounds contribute to a high clearing point and reduction in the threshold voltage without increasing $\Delta n$, in the resulting composition. The content of these compounds is preferably about 14.2 to 60% by weight. If it is less than 14.2% by weight, the abovementioned contribution to Δn, clearing point and threshold voltage is small, whereas if it exceeds 60% by weight, the lower limit temperature of the nematic phase of the resulting composition rises and the operation temperature range on the lower temperature side is narrowed.

In the liquid crystal composition of the present invention, compounds expressed by the formula (II), i.e.
2-(4-fluorophenyl)-5-alkylpyrimidines and
2-(3,4-difluorophenyl)-5-alkylpyrimidines exhibit no liquid crystal phase at room temperature, but they contribute to increase in the Δε value, reduction in the Δn value and reduction in the viscosity in the compositions obtained by using these compounds. Further, the content of these compounds is preferably about 25% by weight or less. If it exceeds 25% by weight, no liquid crystal phase is exhibited at room temperature; hence the clearing point of the resulting liquid crystal composition is often lower.

In the liquid crystal composition of the present invention, compounds expressed by the formula (III), i.e.
4''-(trans-4-alkylcyclohexyl)alkoxybenzenes,
4-alkoxyphenyl trans-4-alkylcyclohexanecarboxylates,
4-fluorophenyl trans-4-alkylcyclohexanecarboxylates,
4-fluorophenyl trans-4-(trans-4-alkylcyclohexyl)-cyclohexanecarboxylates, etc.,
have a low viscosity and a small Δn value, but exhibit a positive or negative Δε value close to zero; hence they often raise the threshold voltage of the resulting liquid crystal composition depending on blending thereof. The content of these compounds is preferably 25% by weight or less.

In the liquid crystal composition of the present invention, compounds expressed by the formula (IV), i.e.
4-{trans-4-(trans-4-alkylcyclohexyl)cyclohexyl}-alkylbenzenes,
4-{trans-4-(trans-4-alkylcyclohexyl)cyclohexyl}-benzonitriles,
4'-(trans-4-alkylcyclohexyl)-4-alkylbiphenyls, etc. exhibit a low viscosity for three-ring compounds, but exhibit a high clearing point of 146.3° C. or higher; hence they contribute to viscosity reduction, retention of clearing point, etc. in the resulting liquid crystal composition, but the lower limit temperature of nematic phase rises depending on blending thereof with other compounds and the operation temperature range on the lower temperature side is narrowed; hence the content of these compounds is preferably 10% by weight or less.

The present invention will be described in more detail by way of examples, but it should not be construed to be limited thereto.

In order to show the effectiveness of the liquid crystal composition of the present invention and the display element using the composition, a manner expressing the characteristic values of the composition will be described.

In addition, the threshold voltage and the temperature dependency of the threshold voltage in the present invention are defined as follows:

In the voltage-brightness characteristic, a voltage at which the transmittance of light in the light axis direction perpendicular to the display surface reaches 10% is referred to as threshold voltage and expressed by Vth. Further, when the respective threshold voltages at two different temperatures $t_1$ (°C.) and $t_2$ (°C.) are expressed by Vth ($t_1$) and Vth ($t_2$), the temperature dependency of the threshold voltage dV/dt is determined by the following equation (1):

$$\frac{dV}{dt} = \frac{Vth(t_1) - Vth(t_2)}{\frac{Vth(t_1) + Vth(t_2)}{2}} \times \frac{100}{t_1 - t_2} \ [\%/°C.] \quad (1)$$

Thus, this equation shows that the nearer the absolute value of the parameter dV/dt is to zero, the more the temperature dependency is improved. In the following Examples and Comparative examples, the compositions are expressed in terms of % by weight.

Example 1

A liquid crystal composition consisting of the following 5 compounds of the formula (I) was prepared:

| | |
|---|---|
| 4-(trans-4-ethylcyclohexyl)-2-fluorobenzonitrile | 20% |
| 4-(trans-4-propylcyclohexyl)-2-fluorobenzonitrile | 20% |
| 4-{trans-4-(trans-4-ethylcyclohexyl)cyclohexyl}-1,2-difluorobenzene | 20% |
| 4-{trans-4-(trans-4-propylcyclohexyl)cyclohexyl}-1,2-difluorobenzene | 20% |
| 4-{trans-4-(trans-4-ethylcyclohexyl)cyclohexyl}-2-fluorobenzonitrile | 20% |

This liquid crystal composition exhibited a clearing point of 60.4° C., an optical anisotropy value of 0.111 and a viscosity at 20° C. of 33.0 cp.

This liquid crystal composition was placed in a 90° twist TN cell having a rubbed film of a polyimide on the respective opposed transparent electrodes under a condition of d·Δn=550 nm, followed by measuring various characteristics. Here, d refers to the thickness of the cell i.e. a distance between the electrodes. The threshold voltage at 25° C. was 1.05 V and the temperature dependency of the threshold voltages at from 0° C. to 40° C. (dV/dt) was −0.40%/°C.

Example 2

A liquid crystal composition consisting of three compounds of the formula (I),

| | |
|---|---|
| 4-(trans-4-ethylcyclohexyl)-2-fluorobenzonitrile | 14.3% |
| 4-(trans-4-propylcyclohexyl)-2-fluorobenzonitrile | 14.2% |
| 4-{trans-4-(trans-4-propylcyclohexyl)cyclohexyl}-2-fluorobenzonitrile | 14.2% |
| two compounds of the formula (II) | |
| 2-(3,4-difluorophenyl)-5-propylpyrimidine | 9.5% |
| 2-(4-fluorophenyl)-5-ethylpyrimidine | 14.3% |
| three compounds of the formula (IV) | |
| 4-{trans-4-(trans-4-propylcyclohexyl)cyclohexyl}-toluene | 9.5% |
| 4-{trans-4-(trans-4-propylcyclohexyl)cyclohexyl}-propylbenzene | 19% |
| 4-{trans-4-(trans-4-propylcyclohexyl)cyclohexyl}-benzonitrile | 5% | was prepared, followed by measuring its characteristics in the same manner as in Example 1. The results are shown in Table 1.

Example 3

A liquid crystal composition consisting of six compounds of the formula (I),

| | |
|---|---|
| 4-(trans-4-ethylcyclohexyl)-2-fluorobenzonitrile | 15% |
| 4-(trans-4-propylcyclohexyl)-2-fluorobenzonitrile | 10% |
| 4-{trans-4-(trans-4-ethylcyclohexyl)cyclohexyl}-1,2-difluorobenzene | 15% |
| 4-{trans-4-(trans-4-propylcyclohexyl)cyclohexyl}-1,2-difluorobenzene | 15% |
| 4-{trans-4-(trans-4-ethylcyclohexyl)cyclohexyl}-2-fluorobenzonitrile | 15% |
| 4-{trans-4-(trans-4-propylcyclohexyl)cyclohexyl}-2-fluorobenzonitrile | 15% |
| two other compounds, | |
| 4-(trans-4-ethylcyclohexyl)benzonitrile | 10% |
| 4'-ethyl-4-cyanobiphenyl | 5% | was prepared, followed by measuring its characteristics in the same manner as in Example 1. The results are shown in Table 1.

Example 4

A liquid crystal composition consisting of seven compounds of the formula (I),

| | |
|---|---|
| 4-(trans-4-ethylcyclohexyl)-2-fluorobenzonitrile | 7% |
| 4-(trans-4-propylcyclohexyl)-2-fluorobenzonitrile | 6% |
| 4-{trans-4-(trans-4-ethylcyclohexyl)cyclohexyl}-1,2-difluorobenzene | 7% |
| 4-{trans-4-(trans-4-propylcyclohexyl)cyclohexyl}-1,2-difluorobenzene | 7% |
| 4-{trans-4-(trans-4-pentylcyclohexyl)cyclohexyl}-1,2-difluorobenzene | 3% |
| 4-{trans-4-(trans-4-ethylcyclohexyl)cyclohexyl}-2-fluorobenzonitrile | 13% |
| 4-{trans-4-(trans-4-propylcyclohexyl)cyclohexyl}-2-fluorobenzonitrile | 13% |
| a compound of the formula (II) | |
| 2-(3,4-difluorophenyl)-5-propylpyrimidine | 11% |
| three compounds of the formula (III) | |
| 4-ethoxyphenyl trans-4-propylcyclohexanecarboxylate | 8% |
| 4-ethoxyphenyl trans-4-butylcyclohexanecarboxylate | 8% |
| 4-butoxyphenyl trans-4-butylcyclohexanecarboxylate | 9% |
| another compound | |
| trans-2-(4-cyanophenyl)-5-propyl-1,3-dioxane | 8% | was prepared, followed by measuring its characteristics in the same manner as in Example 1. The results are shown in Table 1.

Comparative example 1

A liquid crystal composition consisting of the following component A, component B and component C (seven compounds in total) was prepared:
component A: cyanophenylmetadioxanes which, when dissolved in 15% by weight of known composition of cyanophenylcyclohexanes (Zli-1083, tradename of a product made by Merck Company), the resulting compositions exhibit and exceptionally low Δn and an exceptionally large Δε, concretely a clearing point of 26.0° to 41.3° C., a Δn value of 0.09 to 0.100 and a Δε value of 25.6 to 26.9 in terms of extrapolated values:

| | |
|---|---|
| trans-2-(4-cyanophenyl)-5-propyl-1,3-dioxane | 19.6% |
| trans-2-(4-cyanophenyl)-5-butyl-1,3-dioxane | 19.6% |
| trans-2-(4-cyanophenyl)-5-pentyl-1,3-dioxane | 19.6% | component B: phenyl cyclohexanecarboxylates which exhibit specific characteristic values of a Δn value of 0.087 and a Δε value of −1.2 and have been generally known to persons skilled in the art to be suitable for reducing the temperature dependency of threshold voltage:

| | |
|---|---|
| 4-ethoxyphenyl trans-4-propylcyclohexanecarboxylate | 10% |
| 4-ethoxyphenyl trans-4-butylcyclohexanecarboxylate | 10% |
| 4-butoxyphenyl trans-4-butylcyclohexanecarboxylate | 13.3% |

Component C: a known biphenyl cyclohexane generally used by persons skilled in the art for securing transparent point, 4'-(trans-4-pentylcyclohexyl)-4-cyanobiphenyl 7.9%, followed by measuring its characteristics in the same manner as in Example 1. The results are shown in Table 1.

TABLE 1

| Characteristics | Example 1 | Example 2 | Example 3 | Example 4 | Comp. ex. 1 |
|---|---|---|---|---|---|
| Clearing point (°C.) | 60.4 | 65.8 | 71.0 | 63.7 | 60.7 |
| Optical anisotropy | 0.110 | 0.110 | 0.110 | 0.096 | 0.110 |
| Viscosity (20° C.)(cp) | 33.0 | 19.2 | 34.2 | 36 | 34 |
| Vth(25° C.)[V] | 1.05 | 1.13 | 1.12 | 1.15 | 1.15 |
| dV/dt(0~40° C.) [%/°C.] | −0.40 | −0.37 | −0.29 | −0.34 | −0.61 |

Example 5

A liquid crystal composition consisting of seven compounds of the formula (I):

| | |
|---|---|
| 4-(trans-4-pentylcyclohexyl)-1,2-difluorobenzene | 10% |
| 4-(trans-4-ethylcyclohexyl)-2-fluorobenzonitrile | 10% |
| 4-(trans-4-propylcyclohexyl)-2-fluorobenzonitrile | 10% |
| 4-{trans-4-(trans-4-ethylcyclohexyl)cyclohexyl}-1,2-difluorobenzene | 15% |
| 4-{trans-4-(trans-4-propylcyclohexyl)cyclohexyl}-1,2-difluorobenzene | 15% |
| 4-{trans-4-(trans-4-ethylcyclohexyl)cyclohexyl}-2-fluorobenzonitrile | 10% |
| 4-{trans-4-(trans-4-propylcyclohexyl)cyclohexyl}-2-fluorobenzonitrile | 10% |
| a compound of the formula (IV) | |
| 4-{trans-4-(trans-4-propylcyclohexyl)cyclohexyl}-propylbenzene | 10% |
| another compound | |
| 4-(trans-4-methoxymethylcyclohexyl)benzonitrile | 10% | was prepared, followed by measuring its characteristics in the same manner as in Example 1. The results are shown in Table 2.

Example 6

A liquid crystal composition consisting of six compounds of the formula (I),

| | |
|---|---|
| 4-(trans-4-ethylcyclohexyl)-2-fluorobenzonitrile | 12.2% |
| 4-(trans-4-propylcyclohexyl)-2-fluorobenzonitrile | 14.6% |
| 4-(trans-4-pentylcyclohexyl)-2-fluorobenzonitrile | 12.2% |
| 4-{trans-4-(trans-4-ethylcyclohexyl)cyclohexyl}-1,2-difluorobenzene | 13.4% |
| 4-{trans-4-(trans-4-propylcyclohexyl)cyclohexyl}-1,2-difluorobenzene | 13.4% |
| 4-{trans-4-(trans-4-pentylcyclohexyl)cyclohexyl}-1,2-difluorobenzene | 13.4% |
| two compounds of the formula (III) | |

-continued

| | |
|---|---|
| 4-fluorophenyl trans-4-(trans-4-propylcyclohexyl)-cyclohexanecarboxylate | 4.9% |
| 4-fluorophenyl trans-4-(trans-4-pentylcyclohexyl)-cyclohexanecarboxylate | 4.9% |
| two compounds of the formula (IV) | |
| 4-{trans-4-(trans-4-propylcyclohexyl)cyclohexyl}-fluorobenzene | 6.1% |
| 4-{trans-4-(trans-4-propylcyclohexyl)cyclohexyl}-methoxybenzene | 4.0% | was prepared, followed by measuring its characteristics in the same manner as in Example 1. The results are shown in Table 2.

Example 7

A liquid crystal composition consisting of five compounds of the formula (I),

| | |
|---|---|
| 4-(trans-4-ethylcyclohexyl)-2-fluorobenzonitrile | 12% |
| 4-(trans-4-propylcyclohexyl)-2-fluorobenzonitrile | 12% |
| 4-{trans-4-(trans-4-ethylcyclohexyl)cyclohexyl}-1,2-difluorobenzene | 15% |
| 4-{trans-4-(trans-4-propylcyclohexyl)cyclohexyl}-1,2-difluorobenzene | 15% |
| 4-{trans-4-(trans-4-propylcyclohexyl)cyclohexyl}-2-fluorobenzonitrile | 8% |
| one compound of the formula (II) | |
| 2-(4-fluorophenyl)-5-ethylpyrimidine | 15% |
| two compounds of the formula (IV) | |
| 4-{trans-4-(trans-4-propylcyclohexyl)cyclohexyl}-toluene | 9% |
| 4-{trans-4-(trans-4-propylcyclohexyl)cyclohexyl}-propylbenzene | 14% | was prepared, followed by measuring its characteristics in the same manner as in Example 1. The results are shown in Table 2.

Example 8

A liquid crystal composition consisting of two compounds of the formula (I),

| | |
|---|---|
| 4-(trans-4-ethylcyclohexyl)-2-fluorobenzonitrile | 18% |
| 4-(trans-4-propylcyclohexyl)-2-fluorobenzonitrile | 18% |
| five compounds of the formula (III) | |
| 4-ethoxyphenyl trans-4-propylcyclohexanecarboxylate | 10% |
| 4-ethoxyphenyl trans-4-butylcyclohexanecarboxylate | 10% |
| 4-butoxyphenyl trans-4-butylcyclohexanecarboxylate | 7% |
| 4-fluorophenyl trans-4-(trans-4-propylcyclohexyl)-cyclohexanecarboxylate | 4.5% |
| 4-fluorophenyl trans-4-(trans-4-pentylcyclohexyl)-cyclohexanecarboxylate | 4.5% |
| three compounds of the formula (IV) | |
| 4-{trans-4-(trans-4-propylcyclohexyl)cyclohexyl}-benzonitrile | 5% |
| 4-{trans-4-(trans-4-ethylcyclohexyl)cyclohexyl}-benzonitrile | 5% |
| 4'-(trans-4-pentylcyclohexyl)-4-ethylbiphenyl | 9% |
| another compound | |
| trans-2-(4-cyanophenyl)-5-propyl-1,3-dioxane | 9% | was prepared, followed by measuring its characteristics in the same manner as in Example 1. The results are shown in Table 2.

Example 9

A liquid crystal composition consisting of five compounds of the formula (I),

| | |
|---|---|
| 4-(trans-4-ethylcyclohexyl)-2-fluorobenzonitrile | 15% |
| 4-(trans-4-propylcyclohexyl)-2-fluorobenzonitrile | 15% |
| 4-{trans-4-(trans-4-ethylcyclohexyl)cyclohexyl}-1,2-difluorobenzene | 15% |
| 4-{trans-4-(trans-4-propylcyclohexyl)cyclohexyl}-1,2-difluorobenzene | 15% |
| 4-{trans-4-(trans-4-pentylcyclohexyl)cyclohexyl}-1,2-difluorobenzene | 10% |
| one compound of the formula (III) | |
| 4-(trans-4-propylcyclohexyl)ethoxybenzene | 8% |
| two compounds of the formula (IV) | |
| 4-{trans-4-(trans-4-propylcyclohexyl)cyclohexyl}-benzonitrile | 6% |
| 4-{trans-4-(trans-4-ethylcyclohexyl)cyclohexyl}-benzonitrile | 6% |
| another compound | |
| trans-2-(4-cyanophenyl)-5-propyl-1,3-dioxane | 10% | was prepared, followed by measuring its characteristics in the same manner as in Example 1. The results are shown in Table 2.

Comparative example 2

A liquid crystal composition consisting of the following components A, B and C used in Comparative example 1 and further the following component D, that is, a known compound, 4'-(trans-4-pentylcyclohexyl)-4-cyanobiphenyl having a clearing point of 280.0° C. was prepared:

| | |
|---|---|
| component A | |
| trans-2-(4-cyanophenyl)-5-propyl-1,3-dioxane | 19.6% |
| trans-2-(4-cyanophenyl)-5-butyl-1,3-dioxane | 19.6% |
| trans-2-(4-cyanophenyl)-5-pentyl-1,3-dioxane | 19.6% |
| component B | |
| 4-ethoxyphenyl trans-4-propylcyclohexane-carboxylate | 9% |
| 4-ethoxyphenyl trans-4-butylcyclohexane-carboxylate | 9% |
| 4-butoxyphenyl trans-4-butylcyclohexane-carboxylate | 11.3% |
| component C | |
| 4'-(trans-4-pentylcyclohexyl)-4-cyanobiphenyl | 7.9% |
| component D | |
| 4'-cyano-4-biphenylyl trans-4-(trans-4-pentyl-cyclohexyl)cyclohexanecarboxylate | 4% |

The characteristics of the composition was then measured in the same manner as in Example 1. The results are shown in Table 2.

TABLE 2

| Characteristics | example | | | | | Comp. ex. |
| | Example | | | | | |
| | 5 | 6 | 7 | 8 | 9 | 2 |
|---|---|---|---|---|---|---|
| Clearing point (°C.) | 68.6 | 61.1 | 68.5 | 61.4 | 61.3 | 70.1 |
| Optical anisotropy | 0.094 | 0.078 | 0.098 | 0.089 | 0.093 | 0.117 |
| Viscosity (20° C.) (cp) | 26.7 | 22.2 | 20.5 | 23.9 | 25.5 | 35 |
| Vth(25° C.) [V] | 1.22 | 1.36 | 1.28 | 1.16 | 1.18 | 1.38 |
| dV/dt (0~40° C.) [%/°C.] | −0.33 | −0.38 | −0.34 | −0.42 | −0.43 | −0.53 |

The liquid crystal composition and the liquid crystal display element of the present invention have various characteristics required for liquid crystal materials used for twist nematic (TN) mode liquid crystal display elements, particularly multiplex drive TN elements, namely, a sufficiently low viscosity for securing response properties, a sufficiently low Δn value for obtaining a broad viewing angle, particularly a low threshold voltage for low voltage drive and its low temperature dependency, and these various characteristics have been notably improved as compared with those of conventional compositions and display elements.

As to the temperature dependency of threshold voltage defined by the above equation (1), the nearer the dependency is to zero, the more it is desired, and in the present invention, a low value has been achieved. It has been well known for persons skilled in the art that as the threshold voltage is lowered, the temperature dependency thereof increases, that is, this has a bad influence upon display elements, but as directly shown in comparison of Comparative example 1 with Example 1, the compound of the formula (I) of the present invention has almost the same clearing point and the same low Δn value as those of Comparative example 1 and nevertheless affords particularly a lower threshold voltage and a lower temperature dependency of threshold voltage.

Further, as seen from comparisons of Comparative example 1 with Examples 2 to 4 and those of Comparative example 2 with Examples 5 to 9 in Table 2, particularly a lower threshold voltage and a reduced temperature dependency of threshold voltage are exhibited while clearing point, Δn and viscosity values are kept well-balanced. It is considered that the compounds of the formulas (I) and (II) greatly contribute to the above facts and particularly the compound of the formula (I) does.

Since the nematic liquid crystal composition of the present invention has the above-mentioned characteristics, when the composition is used, a broad viewing angle and a low-voltage multiplex drive (e.g. 1.5 V, ½-⅓ duty drive) is possible.

What is claimed is:

1. A liquid crystal composition for twist nematic mode comprising a component expressed by the formula

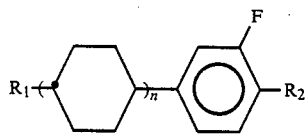

wherein $R_1$ represents an alkyl group of 1 to 8 carbon atoms, $R_2$ represents F or CN and n represents 1 or 2 including about 13 to about 40%, by weight, of at least one compound in which n=1 and about 14.2%, to about 60% by weight, of at least one compound in which n=2, the total proportion of said compounds of said component of formula (I) being about 42.7 to about 100%, by weight.

2. A liquid crystal composition for twist nematic mode according to claim 1 wherein said compounds represented by the formula (I) comprise a first component and further comprises a second component including at least one member selected from the group consisting of a compound expressed by the formula

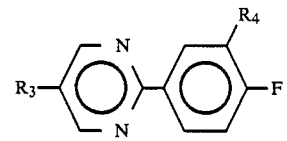

wherein $R_3$ represents an alkyl group of 1 to 8 carbon atoms and $R_4$ represents H or F;

a compound expressed by the formula

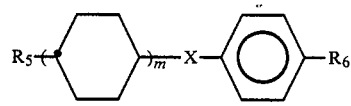

wherein $R_5$ represents an alkyl group of 1 to 8 carbon atoms, $R_6$ represents an alkoxy group of 1 to 8 carbon atoms or F, m represents 1 or 2 and X represents a single bond or —COO—, and a compound expressed by the formula

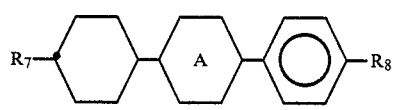

wherein $R_7$ represents an alkyl group of 1 to 8 carbon atoms, $R_8$ represents an alkyl group or alkoxy group each of 1 to 8 carbon atoms, F or CN group and

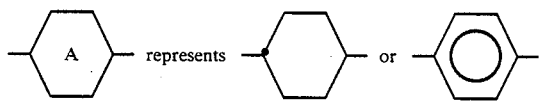

3. A liquid crystal composition for twist nematic mode according to claim 2, wherein the proportion of the compound of the formula (II) is 25% by weight or less, that of the compound of the formula (III) is 30% by weight or less and that of the compound of the formula (IV) is 35% by weight or less.

4. A liquid crystal display element including a liquid crystal composition for twist nematic mode as set forth in claim 1.

5. A liquid crystal display element including a liquid crystal composition for twist nematic mode as set forth in claim 2.

6. A liquid crystal composition for twist nematic mode according to claim 1 wherein said composition exhibits an absolute value of temperature dependency, dV/dt, of less than 0.43.

7. A liquid crystal composition for twist nematic mode according to claim 2 wherein said composition exhibits an absolute value of temperature dependency, dV/dt, of less than 0.43.

8. A liquid crystal composition for twist nematic mode according to claim 6 wherein said composition has an optical anisotropy value of no more than 0.11.

9. A liquid crystal composition for twist nematic mode according to claim 7 wherein said composition has an optical anisotropy value of no more than 0.11.

10. A liquid crystal composition for twist nematic mode according to claim 1 wherein $R_1$ represents ethyl, propyl or pentyl.

11. A liquid crystal composition for twist nematic mode according to claim 2 wherein $R_3$ represents ethyl or propyl.

12. A liquid crystal composition for twist nematic mode according to claim 2 wherein $R_5$ represents propyl, butyl or pentyl.

13. A liquid crystal composition for twist nematic mode according to claim 2 wherein $R_6$ represents ethoxy.

14. A liquid crystal composition for twist nematic mode according to claim 2 wherein $R_7$ represents ethyl or propyl.

15. A liquid crystal composition for twist nematic mode according to claim 2 wherein $R_8$ represents methyl or propyl.

16. A liquid crystal composition for twist nematic mode according to claim 2 wherein $R_8$ represents methoxy.

17. A liquid crystal composition for twist nematic mode according to claim 1 comprising, by weight, the compounds of formula (I):

| | |
|---|---|
| 4-(trans-4-ethylcyclohexyl)-2-fluorobenzonitrile | 20%, |
| 4-(trans-4-propylcyclohexyl)-2-fluorobenzonitrile | 20%, |
| 4-{trans-4-(trans-4-ethylcyclohexyl)cyclohexyl]-1,2-difluorobenzene, | 20% |
| 4-{trans-4-(trans-4-propylcyclohexyl)cyclohexyl}-1,2-difluorobenzene, and | 20% |
| 4-{trans-4-(trans-4-ethylcyclohexyl)cyclohexyl}-2-fluorobenzonitrile. | 20% |

18. A liquid crystal composition for twist nematic mode according to claim 1 comprising, by weight, the compounds of formula (I):

| | |
|---|---|
| 4-(trans-4-ethylcyclohexyl)-2-fluorobenzonitrile | 14.3%, |
| 4-(trans-4-propylcyclohexyl)-2-fluorobenzonitrile and | 14.2%, |
| 4-{trans-4-(trans-4-propylcyclohexyl)cyclohexyl}-2-fluorobenzonitrile; | 14.2% |
| the compounds of the formula (II): | |
| 2-(3,4-difluorophenyl)-5-propylpyrimidine and | 9.5% |
| 2-(4-fluorophenyl)-5-ethylpyrimidine | 14.3%; |
| and the compounds of the formula (IV): | |
| 4-{trans-4-(trans-4-propylcyclohexyl)cyclohexyl}toluene, | 9.5%, |
| 4-{trans-4-(trans-4-propylcyclohexyl)cyclohexyl} propylbenzene, and | 19% |
| 4-{trans-4-(trans-4-propylcyclohexyl)cyclohexyl} benzonitrile. | 5% |

19. A liquid crystal composition for twist nematic mode according to claim 1 comprising, by weight, the compounds of formula (I):

| | |
|---|---|
| 4-(trans-4-ethylcyclohexyl)-2-fluorobenzonitrile | 15%, |
| 4-(trans-4-propylcyclohexyl)-2-fluorobenzonitrile | 10%, |
| 4-{trans-4-(trans-4-ethylcyclohexyl)cyclohexyl}-1,2-difluorobenzene, | 15% |
| 4-{trans-4-(trans-4-propylcyclohexyl)cyclohexyl}-1,2-difluorobenzene, | 15% |
| 4-{trans-4-(trans-4-ethylcyclohexyl)cyclohexyl}-2-fluorobenzonitrile, and | 15% |
| 4-{trans-4-(trans-4-propylcyclohexyl)cyclohexyl}-2-fluorobenzonitrile. | 15% |

20. A liquid crystal composition for twist nematic mode according to claim 2 comprising, by weight, the compounds of formula (I):

| | |
|---|---|
| 4-(trans-4-ethylcyclohexyl)-2-fluorobenzonitrile | 7%, |
| 4-(trans-4-propylcyclohexyl)-2-fluorobenzonitrile | 6%, |
| 4-{trans-4-(trans-4-ethylcyclohexyl)cyclohexyl}-1,2-difluorobenzene, | 7% |
| 4-{trans-4-(trans-4-propylcyclohexyl)cyclohexyl}-1,2-difluorobenzene, | 7% |
| 4-{trans-4-(trans-4-pentylcyclohexyl)cyclohexyl}-2-difluorobenzene, | 3% |
| 4-{trans-4-ethylcyclohexyl)cyclohexyl}-2-fluorobenzonitrile and | 13% |
| 4-{trans-4-(trans-4-propylcyclohexyl)cyclohexyl}-2-fluorobenzonitrile, | 13% |
| a compound of the formula (II): | |
| 2-(3,4-difluorophenyl)-5-propylpyrimidine and | 11%; |
| the compounds of the formula (III): | |
| 4-ethoxyphenyl trans-4-propylcyclohexanecarboxylate | 8% |
| 4-ethoxyphenyl trans-4-butylcyclohexanecarboxylate and | 8%, |
| 4-butoxyphenyl trans-4-butylcyclohexanecarboxylate | 9% |

21. A liquid crystal composition for twist nematic mode according to claim 2 comprising, by weight, the compounds of formula (I):

| | |
|---|---|
| 4-(trans-4-pentylcyclohexyl)-1,2-difluorobenzene | 10% |
| 4-(trans-4-ethylcyclohexyl)-2-fluorobenzonitrile | 10% |
| 4-(trans-4-propylcyclohexyl)-2-fluorobenzonitrile | 10% |
| 4-{trans-4-(trans-4-ethylcyclohexyl)cyclohexyl}-1,2-difluorobenzene, | 15% |
| 4-{trans-4-(trans-4-propylcyclohexyl)cyclohexyl}-1,2-fluorobenzonitrile, and | 10% |
| 4-{trans-4-(trans-4-propylcyclohexyl)-2-fluorobenzonitrile; | 10% |
| and a compound of the formula (IV): | |
| 4-{trans-4-(trans-4-ropylcyclohexyl)cyclohexyl} propylbenzene. | 10% |

22. A liquid crystal composition for twist nematic mode according to claim 2 comprising, by weight, the compounds of formula (I):

| | |
|---|---|
| 4-(trans-4-ethylcyclohexyl)-2-fluorobenzonitrile | 12.2% |
| 4-(trans-4-propylcyclohexyl)-2-fluorobenzonitrile | 14.6% |
| 4-(trans-4-pentylcyclohexyl)-2-difluorobenzonitrile | 12.2% |
| 4-{trans-4-(trans-4-ethylcyclohexyl)cyclohexyl)}-1,2-difluorobenzene, | 13.4% |
| 4-{trans-4-(trans-4-propylcyclohexyl)cyclohexyl}-1,2-difluorobenzene, and | 13.4% |
| 4-{trans-4-pentylcyclohexyl)cyclohexyl}-1,2-difluorobenzene; | 13.4% |
| the compounds of the formula (III): | |
| 4-fluorophenyl trans-4-(trans-4-propylcyclohexyl)-cyclohexanecarboxylate, and | 4.9% |
| 4-fluorophenyl trans-4-(trans-4-pentylcyclohexyl)-cyclohexanecarboxylate; | 4.9% |
| the compounds of the formula (IV): | |
| 4-{trans-4-(trans-4-propylcyclohexyl)cyclohexyl}-fluorobenzene, and | 6.1% |
| 4-{trans-4-(trans-4-propylcyclohexyl)cyclohexyl} methoxybenzene. | 4.0% |

23. A liquid crystal composition for twist nematic mode according to claim 2 comprising, by weight, the compounds of formula (I):

| | |
|---|---|
| 4-(trans-4-ethylcyclohexyl)-2-fluorobenzonitrile | 12%, |
| 4-(trans-4-propylcyclohexyl)-2-fluorobenzonitrile | 12%, |
| 4-{trans-4-(trans-4-ethylcyclohexyl)cyclohexyl}-1,2-difluorobenzene, | 15% |
| 4-{trans-4-(trans-4-propylcyclohexyl)cyclohexyl}-1,2-difluorobenzene, and | 15% |
| 4-{trans-4-(trans-4-propylcyclohexyl)cyclohexyl}-2-fluorobenzonitrile; | 8% |
| a compound of the formula (II): | |
| 2-(4-fluorophenyl-5-ethylpyrimidine | |
| and | |
| two compounds of the formula (IV): | |
| 4-{trams-4-(trans-4-propylcyclohexyl)cyclohexyl}toluene | 9% |
| and | |
| 4-{trans-4-(trans-4-propylcyclohexyl)cyclohexyl}-propylbenzene. | 14% |

24. A liquid crystal composition for twist nematic mode according to claim 2 comprising, by weight, the compounds of formula (I):

| | |
|---|---|
| 4-(trans-4-ethylcyclohexyl)-2-fluorobenzonitrile | 15%, |
| 4-(trans-4-propylcyclohexyl)-2-fluorobenzonitrile | 15%, |
| 4-{trans-4-(trans-4-ethylcyclohexyl)cyclohexyl}-1,2-difluorobenzene | 15%, |
| 4-{trans-4-(trans-4-propylcyclohexyl)cyclohexyl}1,2-difluorobenzene | 15%, and |
| 4-{trans-4-(trans-4-pentylcyclohexyl)cyclohexyl}-1,2-difluorobenzene | 10%; |
| a compound of the formula (III): | |
| 4-{trans-4-propylcyclohexyl)ethoxybenzene | 8%; |
| the compounds of the formula (IV): | |
| 4-{trans-4-(trans-4-propylcyclohexyl)cyclohexyl}-benzonitrile | 6% and |
| 4-{trans-4-(trans-4-ethylcyclohexyl)cyclohexyl}-benzonitrile | 6%. |

* * * * *

UNITED STATES PATENT AND TRADEMARK OFFICE
CERTIFICATE OF CORRECTION

PATENT NO. : 4,923,632

DATED : May 8, 1990

INVENTOR(S) : Sawada et al.

It is certified that error appears in the above-identified patent and that said Letters Patent is hereby corrected as shown below:

On the title page:

In item no. [30], Foreign Application Priority Data, change "62-293906" to --62-295906--.

Claim 17, column 13, line 26, change "4-{trans-4-(trans-4-ethylcyclohexyl)cyclohexyl]-1,2-" to --4-{trans-4-(trans-4-ethylcyclohexyl)cyclohexyl}-1,2- --.

Claim 20, column 14, line 11, change "4-{trans-4-(trans-4-pentylcyclohexyl)cyclohexyl}-2-" to --4-{trans-4-(trans-4-pentylcyclohexyl)cyclohexyl}-1,2- --.

Claim 21, column 14, line 33, change "10%" to --15%--;

Claim 21, column 14, line 34, change "fluorobenzonitrile" to --difluorobenzene--;

Claim 21, column 14, line 35, before "and" insert --4-{trans-4-(trans-4-ethylcyclohexyl)cyclohexyl}-2-fluorobenzonitrile      10%--;

Claim 21, column 14, line 36, change "4-{trans-4-(trans-4-propylcyclohexyl}-2-" to --4-{trans-4-(trans-4-propylcyclohexyl)cyclohexyl}-2- --.

Claim 22, column 14, line 47, change "4-{trans-4-(trans-4-ethylcyclohexyl)cyclohexyl)}-1,2-" to --4-{trans-4-(trans-4-ethylcyclohexyl)cyclohexyl}-1,2- --;

UNITED STATES PATENT AND TRADEMARK OFFICE
CERTIFICATE OF CORRECTION

PATENT NO. : 4,923,632

DATED : May 8, 1990

INVENTOR(S) : Sawada et al.

It is certified that error appears in the above-identified patent and that said Letters Patent is hereby corrected as shown below:

Claim 22, column 14, line 52, change "4-{trans-4-pentylcyclohexyl)cyclohexyl}-1,2-" to --4-{trans-4-(trans-4-pentylcyclohexyl)cyclohexyl}-1,2- --.

Claim 23, column 15, line 12, change "2-(4-fluorophenyl-5-ethylpyrimidine" to --2-(4-fluorophenyl)-5-ethylpyrimidine 15%--;

Claim 23, column 15, line 15, change "4-{trams-4-(trans-4-propylcyclohexyl)cyclohexyl}toluene" to --4-{trans-4-(trans-4-propylcyclohexyl)cyclohexyl}toluene--.

Claim 24, column 16, line 9, change "4-{trans-4(trans-4-propylcyclohexyl)cyclohexyl}1,2-" to --4-{trans-4-(trans-4-propylcyclohexyl)cyclohexyl}-1,2- --.

Signed and Sealed this

Ninth Day of November, 1993

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 4,923,632
DATED : May 8, 1990
INVENTOR(S) : Sawada et al

It is certified that error appears in the above-indentified patent and that said Letters Patent is hereby corrected as shown below:

Claim 20, column 14, line 13, change "4- {trans-4-ethyl cyclohexyl)cyclohexyl} -2" to --4- {trans-4-(trans-4-ethyl-cyclohexyl)cyclohexyl} -2- --.

Claim 21, column 14, line 38, change "4-{trans-4-(trans-4-ropylcyclohexyl)cyclohexyl} " to --4-{trans-4-(trans-4-propylcyclohexyl)cyclohexyl} --.

Claim 22, column 14, line 48, change "4-(trans-4-pentylcyclohexyl)-2-difluorobenzonitrile" to --4-(trans-4-pentylcyclohexyl)-2-fluorobenzonitrile--.

Claim 23, column 15, line 12, change "2-(4-fluorophenyl-5-ethylpyrimidine" to --2-(4-fluorophenyl)-5-ethylpyrimidine 15%--.

Claim 24, column 16, line 13, change "4- {trans-4-propylcyclohexyl)ethoxybenzene" to --4-(trans-4-propylcyclohexyl)ethoxybenzene--.

Signed and Sealed this

Twenty-second Day of August, 1995

Attest:

BRUCE LEHMAN

Attesting Officer    Commissioner of Patents and Trademarks